3,192,049
PROCESS FOR PRODUCING A QUICK-COOKING
PASTA-TYPE PRODUCT
Samuel E. Kinsley, New City, N.Y., assignor to General Foods Corporation, White Plains, N.Y., a corporation of Delaware
No Drawing. Continuation of application Ser. No. 110,867, May 18, 1961. This application July 25, 1963, Ser. No. 297,699
6 Claims. (Cl. 99—85)

The present invention is a continuation of Serial No. 110,867, filed May 18, 1961, now abandoned.

The present invention relates to a new, novel, quick-cooking product prepared from farinaceous materials.

More particularly, the present invention relates to a pasta-type product which can be rapidly rehydrated by the consumer without cooking as has heretofore been required in the case of pasta products.

While the cereal art is replete with disclosures of quick-cooking rice and wheat products, there are few disclosures in the pasta art to such quick-cooling products. Those products which are reputed to be quick-cooking in the pasta art still require cooking of the product in boiling water for a considerable period of time. Normally, pasta products in the raw state require about thirty minutes of cooking in water at a rolling boil in order to be edible. The quick-cooking products typified by U.S. 2,704,723 to Poole require approximately 8 to 15 minutes in order to be edible. Furthermore, the pasta products of commerce when rehydrated have a yellowish color and a slimy surface.

It is an object of the present invention to prepare a pasta-type product from farinaceous materials which can be rehydrated by the consumer in less than five minutes. It is a further object of the present invention to prepare a pasta-type product which can be prepared by the consumer merely by mixing such product with water at 180° F.–212° F., without the need for further cooking. It is yet a further object of the present invention to prepare a pasta-type product having a white color when rehydrated. It is still a further object of the present invention to prepare a pasta-type product which does not have a slimy surface when rehydrated.

It has now been discovered that the objects of the present invention may be accomplished by extruding a farinaceous dough into grain form, gelatinizing the starch in said grain, tempering said grain and drying.

As used in the present invention, the term "extruding" refers to any common means for working or developing a dough and for shaping or forming pasta products from such dough usually by means of a macaroni press.

The term "farinaceous dough" refers to doughs processed from hard wheat flours, such as U.S. No. 1 semolina, durum granular, other flours milled from amber durum wheat, and blends thereof. In addition, such doughs may also contain farinaceous fractions from other hard wheats in amount up to about 25% of the wheat fraction. The farinaceous dough also contains lesser amounts of proteinaceous material, preferably proteinaceous materials such as soy flour, deflavored soy flour, soy protein, vital wheat gluten, etc.

The term "grain form" refers to the shape of the extruded dough which is in the shape of any common cereal grain.

The farinaceous material, preferably U.S. No. 1 semolina or durum granular, is blended with a proteinaceous material, preferably deflavored soy bean flour, in ratios of 20:1 to 7:1 and more preferably about 9 parts of farinaceous material to 1 part of proteinaceous material. The blended farinaceous material is mixed with sufficient water to provide a dough after extrusion of 27 to 36% and preferably 30 to 32%.

The blended, hydrated dough is extruded into grain form preferably the size of rice grains, which are gelatinized. Gelatinization is accompilshed by water cooking or steam cooking using atmospheric steam at a temperature above the gelatinization temperature of the starch and preferably at a temperature of 170° F.–212° F., more preferably at a temperature of 185° F.–212° F., and most preferably at a temperature of 205° F.–212° F. Where water cooking is employed, the extruded grain is cooked in sufficient water to permit the extruded grain to hydrate to a moisture content of 65% to 81% and preferably 75% to 80%. Where water cooking is employed, it is preferred to use at least about three or more volumes of water per part by weight of extruded grain and preferably five or more volumes water per part by weight of extruded grain. The extruded grain is cooked for a period of time sufficiently long to gelatinize the starch contained therein, preferably a cooking time of 4 to 12 minutes is employed where the extruded grain is cooked in water at a temperature of about 205° F.–212° F. It will be appreciated that the time of cooking and the temperature of cooking may vary considerably, the essential characteristic of this step being that substantially complete gelatinization of the extruded grain is accomplished. Cooking also increases the protein content of the final product since in cooking more soluble starch than protein is lost, thereby altering the ratio of farinaceous material to proteinaceous material.

The gelatinized, extruded grain may be tempered directly after cooking, although it is preferred to wash the extruded grain to remove free surface starch which may have developed. Washing is accomplished in an excess of cold water, preferably at room temperature or below. The washed extruded grain is drained and then tempered at room temperature for at least 15 minutes, preferably 15 to 205 minutes and most preferably 30 to 60 minutes. It has been found that the tempering step is critical if the desired product is to be obtained. If tempering is not carried out, the desired product having the required density and size will not be obtained. The tempering prevents excessive shrinkage of the dough particles during subsequent drying and permits the attainment of a product having a porous structure which is readily rehydratable in hot water. The size of the dough particles can vary considerably depending upon the particular product desired.

While it is not essential to do so, it is preferred to rewash the extruded grain after tempering in order to reduce the degree of tackiness of the product which causes the individual grains to stick to each other. The rewashing step appears to remove surface starch and provide the desired individual grains with less of a tendency to stick to one another.

The rewashed extruded grains are drained and dried at a temperature and rate sufficient to remove moisture from their surfaces sufficiently faster than it can diffuse thereto from their interiors so as to prevent shrinkage.

It will be appreciated by those skilled in the art that drying times and conditions can vary considerably depending upon the moisture content of the product just prior to drying and the particular drying equipment being employed. The particular type of drier employed is not critical in the present invention provided that the swollen grains can be dried at a rate which removes moisture from their surfaces sufficiently faster than it can diffuse thereto from their interiors so as to prevent shrinkage and produce a porous structure therein, which when rehydrated produces a non-mushy, firm textured product.

The following embodiment represents one means by which the present invention may be carried out.

90.7 pounds of semolina flour were dry blended with 9.3 pounds of deflavored soy flour in a commercial V-type blender. The dry ingredients after blending had a moisture content of about 12%.

The blended mixture was fed into the mixing trough of a commercial TPJ Buhler extruder. Water was simultaneously added to the trough to form a wet mix having a 33% moisture content. The wet mix was then moved from the main mixing trough into the secondary trough of the extruder which is situated above the auger. The wet mix is fed from the secondary trough into the extrusion auger rotating at 8 r.p.m. which compressed and worked the material into a dough and forced it through the die at the discharge end of the extruder. Grains were formed having the approximate length and width of rice grains by cutting the dough to proper lengths using rotating knife blades. The extruded material had a moisture content of 31%.

The extruded grains were cooked in hot water at 208° F. for 5½ minutes to gelatinize the starch and set the grain in its extruded shape.

The cooked grain was washed with cold water immediately after being discharged from the cooker whereby the product was cooled and any agglomerates which formed were broken apart. The washing also removed surface starch from the particles and thereby prevented sticking during and after the subsequent tempering step. The moisture content of the grain after cooking was 70%. The washed grain was then tempered by permitting it to stand at room temperature so that the free water could drain from the product and the product moisture could equilibrate. The product was permitted to temper for one hour after which time it was again washed to remove any residual surface starch and break up any clumps which may have formed during tempering.

The washed product was drained and dried in a continuous belt through circulation drier of the Proctor & Schwartz perforated plate type having two stages and employing air at a temperature of 280° F. and 210° F. down draft. The product was dried to a moisture content of 4% in 14 minutes and the dried cake was fed into finger breakers to obtain the individual grains.

While the present invention has been described with reference to the extrusion and processing of the farinaceous dough in grain form, it is to be understood that the dough may also be extruded and processed in the form of conventional semolina products. Such products have the same desirable properties of the grain shaped products of the present invention.

While the present invention has been described by means of a specific embodiment, it is not to be restricted thereto, reference being had to the appended claims for a definition of the full scope of the invention.

What is claimed is:

1. A process for preparing a quick-cooking pasta-type product which comprises blending a hard wheat flour and a proteinaceous material with sufficient water to form a dough having a moisture content of 27 to 36%, extruding said dough into grain form, substantially completely gelatinizing said extruded dough at a temperature above 170° F., tempering said gelatinized extruded dough for at least 15 minutes, and then drying said extruded dough at a temperature and rate sufficient to remove moisture from its surfaces sufficiently faster than it can diffuse thereto from its interior so as to prevent shrinkage and produce a porous structure therein.

2. A process for preparing a quick-cooking pasta-type product which comprises blending about 9 parts by weight of a hard wheat flour with about one part by weight of a proteinaceous material and sufficient water to form a farinaceous dough having a moisture content of 27 to 36%, extruding said dough into grain form, substantially completely gelatinizing said extruded dough at a temperature above 170° F., washing said extruded dough in an excess of cold water, tempering said extruded dough at room temperature for 15 to 205 minutes, and then drying said extruded dough at a temperature and rate sufficient to remove moisture from its surface sufficiently faster than it can diffuse thereto from its interior so as to prevent shrinkage and produce a porous structure therein.

3. A process for preparing a quick-cooking pasta-type product which comprises blending about 9 parts by weight of a hard wheat flour with about one part by weight of a proteinaceous material and sufficient water to form a farinaceous dough having a moisture content of 27 to 36%, extruding said dough into grain form, substantially completely gelatinizing said extruded dough at a temperature above 170° F., washing said extruded dough in an excess of cold water, tempering said extruded dough at room temperature for 15 to 205 minutes, rewashing said extruded dough in an excess of cold water and drying said extruded dough at a temperature and rate sufficient to remove moisture from its surface sufficiently faster than it can diffuse thereto from its interior so as to prevent shrinkage and produce a porous structure therein.

4. A process for preparing a quick-cooking pasta-type product which comprises blending about 9 parts by weight of semolina flour with about one part by weight of soy bean flour and sufficient water to form a farinaceous dough having a moisture content of 30 to 32%, extruding said farinaceous dough into grain form, water cooking said extruded dough employing at least 3 parts by weight of water per part by weight of extruded dough at a temperature of 170° F. to 212° F. to substantially completely gelatinize said extruded dough, washing said extruded dough in an excess of cold water, tempering said extruded dough for 30 to 60 minutes at room temperature, rewashing said extruded dough in an excess of cold water, and drying said extruded dough at a temperature and rate sufficient to remove moisture from its surface sufficiently faster than it can diffuse thereto from its interior so as to prevent shrinkage and produce a porous structure therein.

5. A process for preparing a quick-cooking pasta-type product which comprises blending a hard wheat flour and a proteinaceous material with sufficient water to form a dough having a moisture content of 30 to 32%, extruding said dough into grain form, substantially completely gelatinizing said extruded dough at a temperature above 170° F., tempering said gelatinized extruded dough for at least 30 minutes, and then drying said extruded dough at a temperature and rate sufficient to remove moisture from its surface sufficiently faster than it can diffuse thereto from its interior so as to prevent shrinkage and produce a porous structure therein.

6. A process according to claim 5 wherein the gelatinization takes place at a temperature of 205° F. to 212° F.

References Cited by the Examiner
UNITED STATES PATENTS

| | | | |
|---|---|---|---|
| 1,925,267 | 9/33 | McKay | 99—81 |
| 2,438,939 | 4/48 | Durrani | 99—80 |
| 2,704,723 | 3/55 | Poole | 99—85 |

A. LOUIS MONACELL, *Primary Examiner.*